United States Patent [19]

Sprenkle

[11] 4,195,400

[45] Apr. 1, 1980

[54] WIRE WRAPPING BIT FOR SEMIAUTOMATIC WIRING MACHINES

[75] Inventor: George J. Sprenkle, Phoenixville, Pa.

[73] Assignee: Burroughs Corporation, Detroit, Mich.

[21] Appl. No.: 970,759

[22] Filed: Dec. 18, 1978

[51] Int. Cl.$^{2}$ .......................... B21F 3/00; B21F 15/00; B23P 19/00

[52] U.S. Cl. ....................................... 29/753; 140/124; 242/7.17

[58] Field of Search .......................... 29/750, 751, 753; 140/118, 119, 122, 124; 242/7.06, 7.17, 7.18

[56] References Cited

U.S. PATENT DOCUMENTS

| | | | |
|---|---|---|---|
| 2,682,063 | 6/1954 | Miloche | 242/7.06 X |
| 2,836,837 | 6/1958 | Belek | 7/14.1 |
| 3,023,484 | 3/1962 | Arens et al. | 29/751 X |
| 3,670,784 | 6/1972 | Ackerman | 140/118 |
| 3,701,367 | 10/1972 | Ackerman | 140/119 |
| 3,882,906 | 5/1975 | Steiner et al. | 140/124 |
| 3,987,823 | 10/1976 | Romania et al. | 140/124 |

OTHER PUBLICATIONS

Wire Wrapping Stylus, Bajan et al.—IBM Technical Disclosure Bulletin, vol. 14, No. 7, Dec. 1971.

*Primary Examiner*—Ervin M. Combs

*Attorney, Agent, or Firm*—Francis A. Varallo; Leonard C. Brenner; Kevin R. Peterson

[57] ABSTRACT

The present disclosure describes an improved side-loading wrap tool or wire wrapping bit for use on semiautomatic wiring machines. The latter are employed to make solderless wrapped connections on terminals emanating from a common plane. In contrast to the wire wrapping bits presently used on the aforementioned machines, the wrapping bit of the present invention retains the wire to be wrapped in a section of the bit which is completely separated from the terminal-receiving aperture thereof. Additionally, the configuration of the wire holding section provides a positive insulation stop and ensures the entrapment of the insulated portion of the wire within the bit in preparation for the wrap cycle.

8 Claims, 6 Drawing Figures

WIRE WRAPPING BIT FOR SEMIAUTOMATIC WIRING MACHINES

BACKGROUND OF THE INVENTION

Semiautomatic machines for attaching interconnection wiring to terminals arranged on a panel by means of solderless wrapped connections are well known in the electronic field. Such machines, while automated to position the wire wrapping bit relative to a selected terminal, require the service of an operator in inserting the wire to be wrapped into the bit for each connection to be made. Present day machines employ a hollow side-loading wrapping bit. The operator inserts a length of wire through an opening in the bit which leads into the hollow terminal-receiving aperture thereof and lays a portion of the wire into a longitudinal groove which runs to the end of the bit. The operation is further complicated in that the panel frequently has a high terminal density, for example, terminals placed on 0.10 or 0.125 inch centers. It follows that the interconnect wire must be of very small diameter, such as No. 30 gauge, necessitating a great deal of care and precision in disposing the wire within the wrapping bit.

Several difficulties are attendant with the use of the aforementioned wrapping bits. The provision of a common aperture to receive both the wire inserted by the operator and subsequently, the terminal to be wrapped may result in the entanglement of the wire and terminal and the breakage of the former within the bit. This is especially true where the terminals are slightly skewed from their normal orientation with respect to the panel surface. Another important consideration in the wire wrapping process is that of controlling the exact length of the insulated portion of the wire to be wrapped, prior to the wrapping operation. The design of the above-described wrapping bit is deficient in this respect. The amount of the insulated portion of the wire wrapped upon a terminal is strictly a function of operator judgment. Where multiple machines and operators are employed, the overall results have been found to be grossly inconsistent. Too little or too much wire insulation loaded into a bit, causes respectively insufficient or extra insulation wraps upon a terminal. Neither of these is consistent with production workmanship standards. As a result, the reject wraps must be removed and replaced—a procedure which is time consuming and costly.

Optimally, what is required is a wire wrapping bit which is convenient to use, obviates all of the aforementioned problems associated with present day bits, and at the same time is a direct replacement therefor. The wrapping bit of the present invention fills such a need.

SUMMARY OF THE INVENTION

In accordance with the present invention, an improved wire wrapping bit is provided for use on wiring machines. The mounting of the new wrapping bit on present day machines is readily accomplished since it is an exact replacement of the old bit.

The wrapping bit of the present invention is a generally cylindrical member having a central aperture for receiving the terminal to be wrapped. The wire holding portion of the bit is comprised of three longitudinally disposed contiguous sections.

The first section farthest removed from the free end of the bit includes substantially planar surfaces having a "flat-bottomed" V-notch formed therein. The relatively wide notch facilitates the initial placement of the end of the stripped wire into the bit. The V-notch terminates in a groove having a width substantially the same as the diameter of the uninsulated wire.

The second section adjacent the free end of the bit includes surfaces which are substantially coplanar with those in the first section. A semicylindrical depression is formed within the planar surfaces of the second section and it has a diameter substantially the same as that of the insulated portion of the wire.

The first and second sections are linked by an intermediate section which includes a bore, coaxial with the semicylindrical depression and having a like diameter. An opening into the bore from the outer surface of the bit is provided by a slot which is in longitudinal alignment with the groove in the first section and has substantially the same width, namely, that of the uninsulated wire diameter.

In the wire wrap operation, the operator places the end of the pre-stripped portion of the wire into the V-notch. Then, by aligning the longitudinal axis of the wire in parallel with that of the bit, the operator lays the bare wire into the groove of the first section, and into the bore of the intermediate section via its slot, and places the insulated portion of the wire into the semicylindrical depression of the second section. The wire is then slid toward the first section, until the insulated portion thereof is within the bore of the intermediate section. The wire is prevented from further motion by the soulder defining the end of the groove, the latter being too narrow to accept the insulated wire. Moreover, the wire is entrapped within the intermediate section, since the diameter of the insulated wire is too large to permit it to pass through the slot in this section.

The distance of the intermediate section from the free end of the bit determines the length, and resultant number of turns, of insulated wire which will be wrapped. The operator need only insure that the insulated portion abuts the stop provided at the junction of the first and intermediate sections. The attainment of this condition may be checked visually since the beginning of the insulated portion of the wire may be seen within the bore at this junction when viewed along the groove.

It should be noted that the wire retaining sections are completely separate from the bit terminal-receiving aperture. Additionally, the number of turns of insulated wire to be wrapped upon a terminal is fixed with the physical parameters of the bit, and is not a function of the operator's judgment. Other features and advantages of the present invention will become apparent in the detailed description appearing hereinafter.

DESCRIPTION OF THE PREFERRED EMBODIMENT

Figure 1:
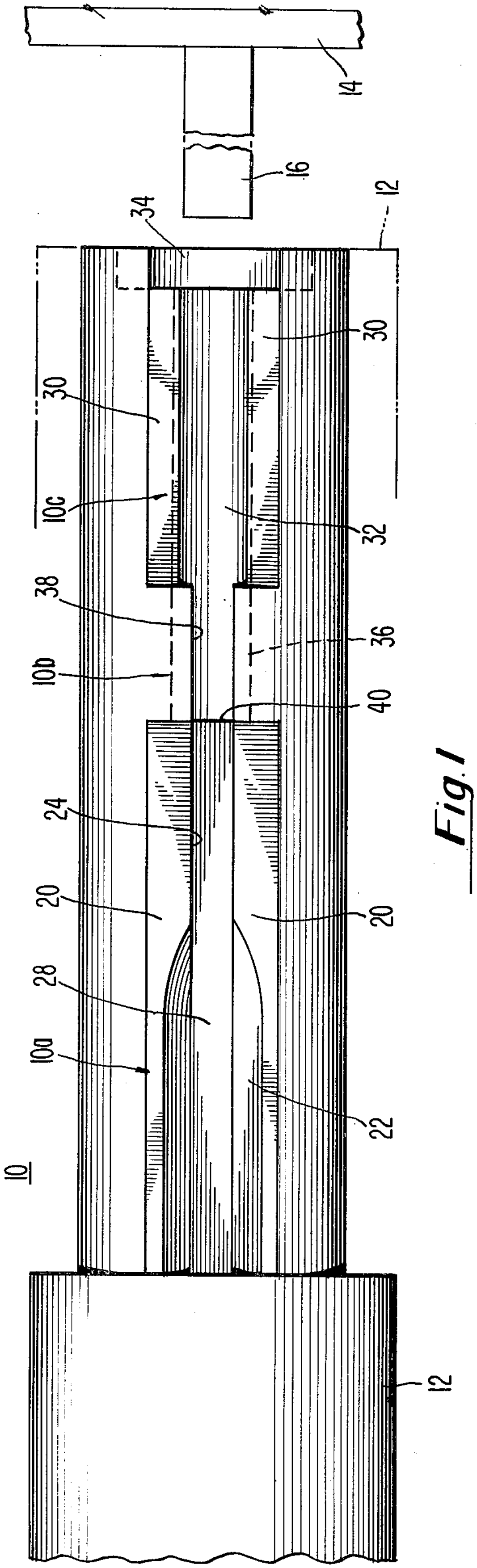
FIG. 1 is a plan view of the wire wrapping bit of the present invention shown disposed in its associate sleeve and in relation to a panel having a terminal to be wrapped.

FIG. 1 illustrates the wire wrapping bit 10 of the present invention shown with its associated sleeve 12 retracted and in relation to a panel or board 14 having a terminal 16 to be wrapped. Before proceeding with a description of the wrapping bit 10, it is believed helpful to review briefly the wire wrap operation of a typical present-day semiautomatic machine.

A vertical table (not shown) on which the panel 14 containing the terminals 16 to be wrapped is positioned by a tape controller to align the selected terminal with the stationary carriage supporting the wrapping tool 10. The tool or bit 10 is movable in an axis perpendicular to the plane of the panel 14 such that it may be moved toward and over the terminal 16. The operator feeds a pre-stripped wire into the wrapping bit 10 and then moves the wrapping tool assembly forward. This motion is detected by the machine, and the sleeve 12 which had been retracted, now moves toward the free end of the bit as indicated by the dashed line in FIG. 1, covering the wire. The operator continues to move the wrapping tool assembly forward onto the selected terminal to a predetermined level. At this time another detection feature within the machine energizes the motor of the wrapping tool assembly which causes the wire to be wrapped on the terminal. Upon retraction of the assembly from the terminal at the completion of the wrap operation, the sleeve again retracts exposing the bit. When the wrapping tool assembly is fully retracted on its carriage, a sensor energizes the tape controller to advance and position the table and the panel mounted thereon for the next wire termination.

Figure 3:
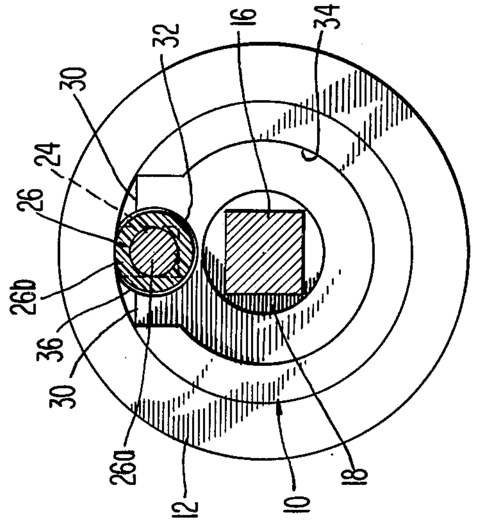
FIG. 3 is an end view similar to that of FIG. 2 but showing the disposition of the wire within the bit and the terminal to be wrapped within the central aperture thereof.
Figure 2:
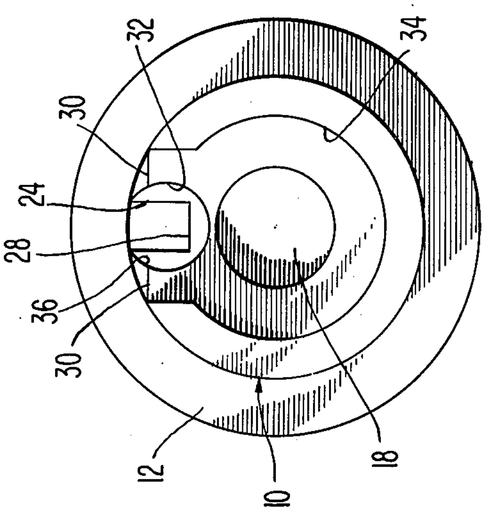
FIG. 2 is an end view of the wire wrapping bit and sleeve of FIG. 1.

With general reference to FIG. 1, and specific reference to FIGS. 2 and 3 where indicated, the wire wrapping bit 10 of the present invention is of generally cylindrical configuration and includes an aperture 18 (FIGS. 2 and 3) for receiving the terminal 16 to be wrapped, which terminal is shown mounted on panel 14.

The bit 10 is comprised of three lonitudinally disposed, contiguous sections, 10*a*, 10*b* and 10*c*. The first section 10*a* comprises substantially planar surfaces 20 having a truncated V-notch 22, that is, a flat-bottomed V-notch, formed therein. The V-notch 22 leads into a groove 24, having a width substantially equal to that of the diameter of the uninsulated conductor portion 26*a* of wire 26 (FIG. 3). The common surface 28 forming the flat bottom of the V-notch 22 and that at the bottom of groove 24 lie in the same plane.

Section 10*c*, adjacent the free end of bit 10 includes surfaces 30 which are substantially coplanar with surfaces 20 in section 10*a*. A semicylindrical depression 32 is formed within the surfaces 30, and has a diameter substantially the same as the insulated portion 26*b* of wire 26 (FIG. 3). A counterbore 34 is also provided of sufficient depth to accommodate the uninsulated conductor 26*a* of wire 26 during the actual wrapping operation.

Sections 10*a* and 10*c* are joined by an intermediate section 10*b* including a bore 36 which is coaxial with the semicylindrical depression 32 in section 10*c* and is of like diameter. A slot 38 is provided in the surface of bit 10 leading into bore 36. Slot 38 is in longitudinal alignment with groove 24 in section 10*a*, and has substantially the same width, namely that of the uninsulated wire conductor 26*a*, as seen in FIG. 3.

Figure 4:
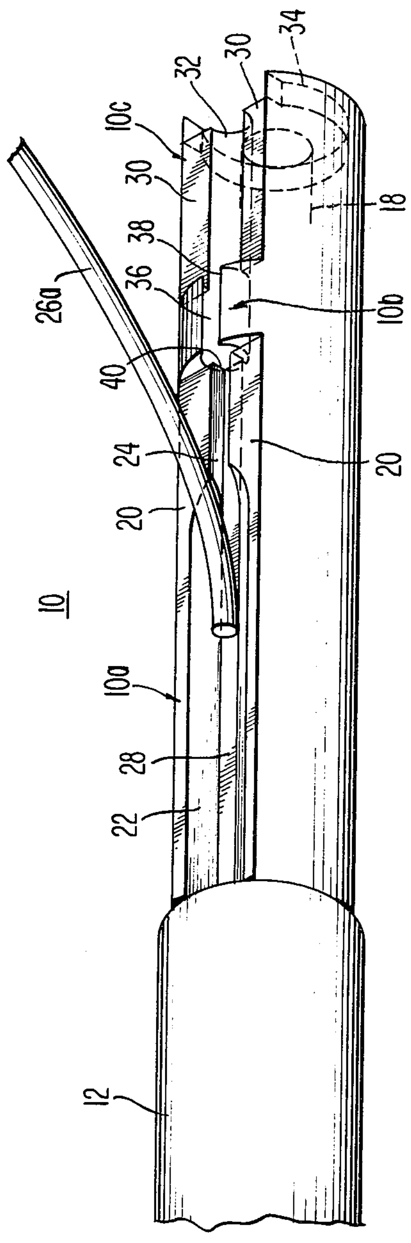
FIG. 4 is a pictorial illustration depicting the initial step of placing the end of the stripped wire into the notch section of the bit.
Figure 5:
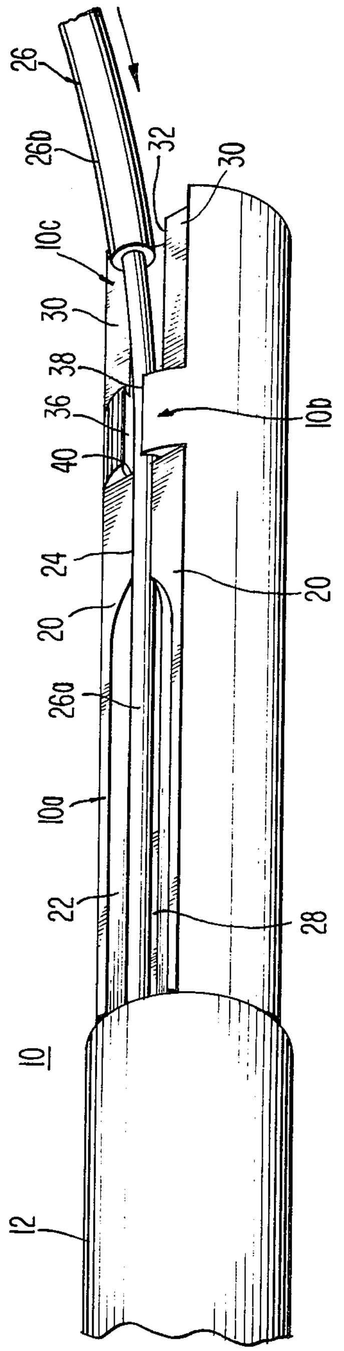
FIG. 5 depicts the further orientation of the wire in its disposition within the bit.
Figure 6:
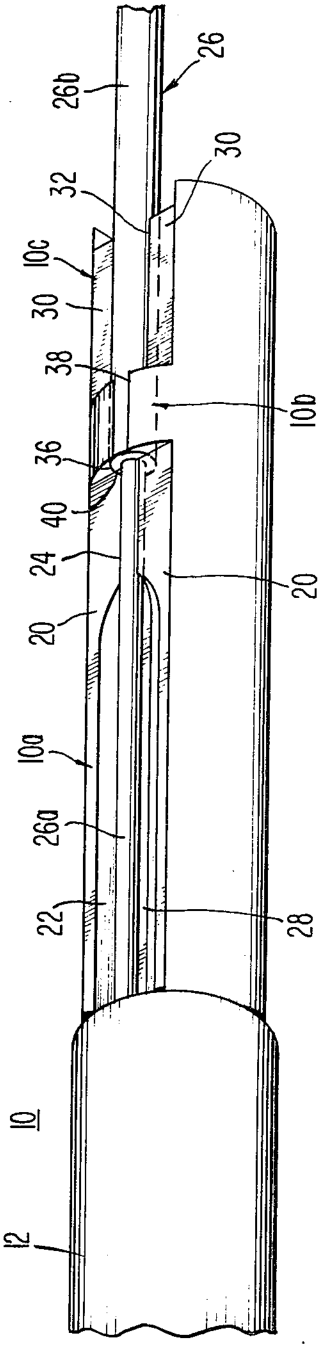
FIG. 6 illustrates the final position of the wire within the bit, with the insulated portion thereof adjacent a stop and entrapped within the bit.

FIGS. 4, 5 and 6 illustrate the steps performed by the operator in loading the bit 10 just prior to the wrapping operation.

In FIG. 4, the operator has placed the end of the stripped portion of the bore wire conductor 26*a* into the V-notch 22 of section 10*a*. The relatively wide area provided by the notch facilitates the entry of the wire 26 therein. Next, as seen in FIG. 5, the operator has moved the wire 26 in the direction of the arrow, while bringing its longitudinal axis into substantial parallel alignment with the axis of bit 20. More specifically, the operator has caused the uninsulated wire conductor 26*a* to lie along the bottom surface 28 of the V-notch 22 and groove 24 of section 10*a*, and has passed it through slot 38 into the bore 36 of section 10*b*. A portion of the uninsulated wire conductor 26*a* also appears within section 10*c* along with the initial insulated portion 26*b* of wire 26. The latter is accommodated by the semicylindrical depression 32.

In FIG. 5, the operator has completed the placement of the wire 26 within the bit. The insulated portion 26*b* of wire 26 is within the bore 36 and abuts the stop provided by the shoulder 40 defining the end of the groove 24. As noted hereinbefore, the width of groove 24 is substantially the same as the diameter of the uninsulated wire conductor 26*a* and is too narrow to admit the insulated portion 26*b* of the wire 26. The operator may visually ascertain that the insulated wire 26*b* has reached shoulder 40 by inspection of that portion of the bore 36 lying above the surfaces 20 in section 10*a*. The insulated wire 26*b* is entrapped within the bore 36 since its diameter is larger than the width of slot 38.

With reference to the semiautomatic machine operation described hereinbefore, the operator need only apply sufficient force to the wire to insure that it remains against the shoulder 40 after the sleeve 12 has advanced to the end of the bit 10 and the bit assembly moves toward the terminal 16. Since the length of the insulated wire 26*b* is fixed by the position of the shoulder stop 40 in relation to the end of the bit 10, the number of turns of insulated wire on each wrappd terminal will be uniform. The purpose of having initial wraps of insulated wire is to provide a measure of strain relief to the wire and to avoid an initial bend of the wire around the terminal at the point where the bare conductor enters the insulative jacket. This latter point is most susceptible to damage by nicking during the stripping of the insulation, and the wire is subject to breakage at this point during wrapping. Production standards require a predetermined number of turns of insulated wire on a terminal. Too many or too few turns are cause for rejection. It has been noted that the wire wrapping bit replaced by the present invention has no positive wire stop and that the operator's judgment determines the length of wire being introduced through a feed hole into the terminal-receiving aperture of the bit. What has not been mentioned previously is that after the sleeve has moved forward to cover the bit, the operator may inadvertently push more of the wire into the feed hole or pull some of the wire out, as the wrap assembly moves toward the terminal. The former results in too many insulative wraps, while the latter produces too few.

In conclusion, it should be noted that although the previous description outlines a specific design of wire wrapping bit for a particular machine, the basic principles taught herein may be applied to other similar wrap mechanisms which differ somewhat in construction or operation. It is further submitted that the wire wrapping bit of the present invention offers a substantial operational improvement over the bit it is designed to replace. Changes and modifications of the present bit may be needed to suit particular requirements. Such variations as are within the skill of the designer, and which do not depart from the true scope and spirit of the invention are intended to be covered by the following claims.

What is claimed is:

1. A wire wrapping bit for use in a wiring machine and having an aperture at its free end for receiving a terminal upon which a wire is to be wrapped comprising:

a generally cylindrical member having in the outer surface thereof a plurality of contiguous, longitudinally disposed sections for receiving said wire prior to a wrapping operation, a first section farthest removed from said free end of said bit including a substantially planar surface having formed therein a notch and a groove in adjacent longitudinal relationship, a second section adjacent said free end of said bit including a surface substantially coplanar with said surface of said first section and having formed therein a semicylindrical depression, a third section intermediate said first and second sections and having a bore substantially coaxial with said semicylindrical depression and being of like diameter, said bore having one of its extremities terminating at said semicylindrical depression and its opposite extremity terminating at said groove, and a slot-like opening into said bore from said outer surface of said member, said opening traversing said third section in substantial longitudinal alignment with said groove in said first section.

2. A wire wrapping bit as defined in claim 1 further characterized in that the width of said groove in said first section and the slot-like opening into said bore of said third section is substantially equal to the diameter of the uninsulated portion of said wire to be wrapped on said terminal, said notch having a width substantially larger than that of said groove and slot-like opening to facilitate the initial entrance of the uninsulated portion of said wire into said member, and the diameter of said semicylindrical depression in said second section and said bore in said third section is substantially equal to the diameter of the insulated portion of said wire to be wrapped on said terminal.

3. A wire wrapping bit as defined in claim 2 further characterized in that said notch in said first section has a truncated "V" configuration, the flat-bottom surface of said notch being coplanar with the surface at the lower extremity of said groove.

4. A wire wrapping bit as defined in claim 3 wherein the shoulder formed at the juncture of said bore and said groove serves as a positive stop for preventing said insulated portion of said wire from entering said groove during the loading of the bit prior to the wire wrapping operation.

5. A wire wrapping bit as defined in claim 4 further characterized in that a portion of said bore is visible above the planar surface of said first section in which said groove is formed, thereby permitting a visual determination that said insulated portion of said wire abuts said positive stop during the bit loading operation.

6. A wire wrapping bit as defined in claim 5 further characterized in that the number of turns of the insulated portion of the wire to be wrapped upon said terminal is a function of the distance between said positive stop and said free end of said bit.

7. A wire wrapping bit as defined in claim 6 further including a counterbore encompassing the area surrounding the terminal-receiving aperture of said bit and extending into said third section, an extremity of said semicylindrical depression terminating in said counterbore, the dimensions of said counterbore being chosen to accommodate said uninsulated portion of said wire during the wire wrapping operation.

8. A wire wrapping bit as defined in claim 7 further characterized in that said plurality of contiguous, longitudinally disposed sections are physically separated from said terminal-receiving aperture, whereby said wire is excluded from said aperture during the loading of said bit.

* * * * *